United States Patent [19]

Moss

[11] Patent Number: 4,505,693

[45] Date of Patent: Mar. 19, 1985

[54] POWER TRANSMISSION CHAIN

[75] Inventor: Hans B. F. Moss, Gothenburg, Sweden

[73] Assignee: AB Volvo, Torslanda, Gothenburg, Sweden

[21] Appl. No.: 464,990

[22] Filed: Feb. 8, 1983

[30] Foreign Application Priority Data

Feb. 12, 1982 [SE] Sweden ............................. 8200839

[51] Int. Cl.³ ............................................... F16G 1/24
[52] U.S. Cl. ...................................... 474/240; 474/245
[58] Field of Search ............... 474/240, 242, 244, 245, 474/237, 219, 228–230, 223–226, 206

[56] References Cited

U.S. PATENT DOCUMENTS

| 1,114,850 | 10/1914 | Bohlman | 474/245 X |
| 1,673,950 | 6/1928 | Reeves | 474/245 |
| 3,364,767 | 1/1968 | Bredschneider et al. | 474/245 |
| 3,754,477 | 8/1973 | Bonifas | 474/230 |
| 4,337,057 | 6/1982 | Horowitz et al. | 474/242 |

Primary Examiner—Stephen J. Novosad
Assistant Examiner—Thuy M. Bui
Attorney, Agent, or Firm—Holman & Stern

[57] ABSTRACT

A power transmission chain consisting of at least a series of overlapping links held together by joints in front and back connections in the form of thrust shafts. Between said thrust shafts are arranged cooperation transmission pieces, which upon rotation transmit a corresponding rotation to the next thrust shaft as seen in the direction of the chain motion. In order to provide a chain which produces insignificant inertial forces, low power losses, low sound and vibration disturbances, low wear and which further allow a torque transmission with low prestress of the chain each thrust shaft is non-rotatably fastened to at least one transmission apparatus comprising a force and motion communicating transmission part, which cooperates with the transmission part attached to the next thrust shaft.

15 Claims, 10 Drawing Figures

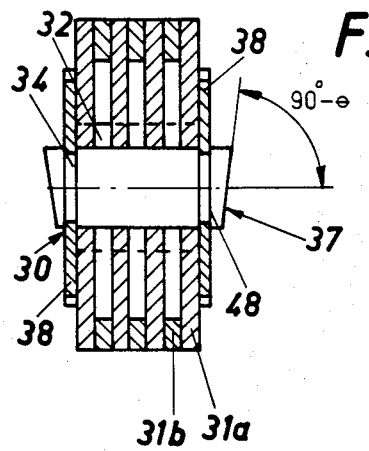
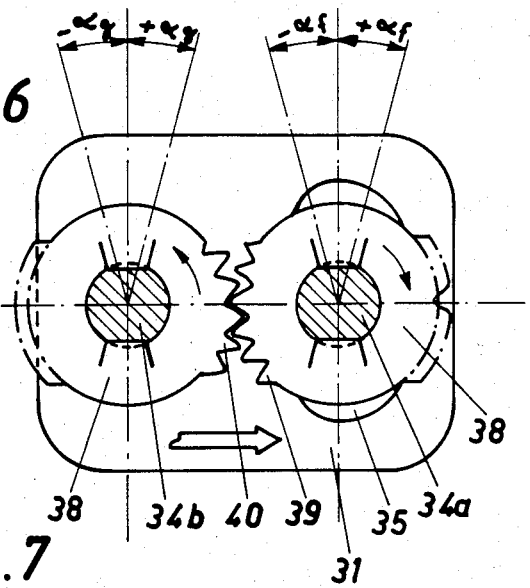
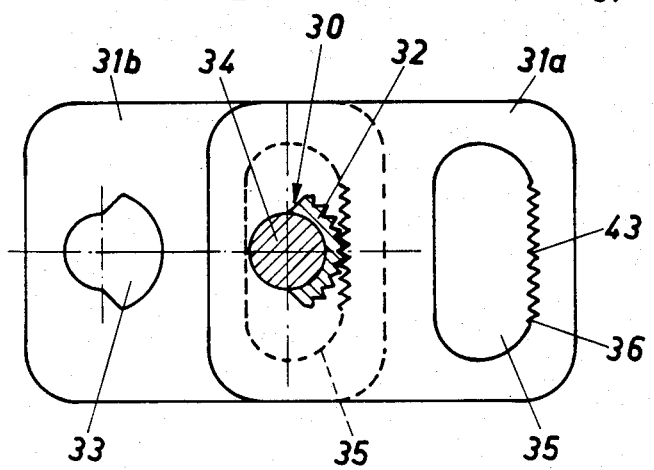
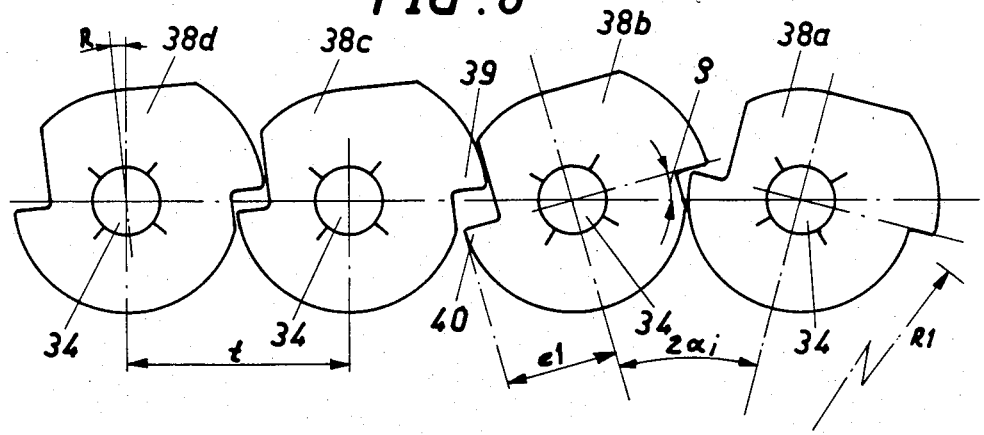

POWER TRANSMISSION CHAIN

BACKGROUND OF THE INVENTION

1. Field of the Invention

The present invention concerns a power chain consisting of at least a series of overlapping links held together by joints in front and back connections as seen in the direction of motion in the form of thrust shafts, between which are placed cooperating transmission pieces which upon rotation transmit a corresponding rotation to the next thrust shaft as seen in the direction of the chain motion.

2. Description of the Prior Art

Power transmission chains of the above type are used in stepless gears with smooth conical plate pairs. The chain is used with power dependent torque transmission, where the transmitted torque is completely dependent on the friction force in the contact points between the thrust shafts of the chain and the respective conical plate.

It is previously known to fix the rear thrust shaft within each link against rotation, as seen in the direction of motion of the chain, the primary object of the fixation being to guarantee that the oblique end surface to the utmost possible extent has the correct direction at its entrance and exit on the respective conical pair of plates. This has however hitherto not been solved. A further drawback of thrust shafts fixed against rotation and with oblique end surfaces is that their inclination does not correspond to the cone angle of the conical plate pairs, which means that actual contact force for the transmission of torque is concentrated at one point with very large contact pressures as a result.

In a known chain (U.S. Pat. No. 2,690,678) actuation of the following thrust shaft has been attempted through spring pieces between the thrust shaft of the chain but the springs are exposed to very large stresses and are therefore not appropriate, and they allow a proper adjustment of the thrust shaft only in the special case where the spring forces on both sides of the thrust shaft are equal. If not, a rotation torque occurs on the thrust shaft, with inequalities in chain speed during the entrance and exit of the chain as a result, which on one hand results in vibration disturbances and on the other hand in a detoriated efficiency. The reduction of efficiency is especially obvious at high chain speeds and low power outputs, or generally 5–10%. The periodically recurrent change of momentum along the free parts of the chain is especially inconvenient at the slack chain part, since variations in momentum cause large vibratory movements.

BRIEF SUMMARY OF THE INVENTION

The object of the present invention is to provide a power transmission chain which produces insignificant inertial forces, much lower power losses and sound and vibration disturbances, and less wear than known chains. The design further allows a torque transmission with much lower prestress of the chain, so that the power density can be increased significantly. This has been achieved by non-rotatably fastening both thrust shafts to at least one transmission apparatus consisting of a force and motion communicating transmission part arranged to cooperate with the transmission part attached to the next thrust shaft.

BRIEF DESCRIPTION OF THE DRAWINGS

The invention will now be described in detail with reference to the accompanying drawings wherein:

FIG. 5 is a cross-sectional view taken along the line V—V in FIG. 3;

FIG. 6 is a side elevational view showing a complete chain link according to the invention;

FIG. 7 is a view similar to FIG. 6 showing two links of a modified embodiment according to the invention;

FIG. 8 is a schematic view from the side showing the motion scheme for an alternative embodiment of the transmission apparatus according to FIG. 7;

DETAILED DESCRIPTION

Figure 1:
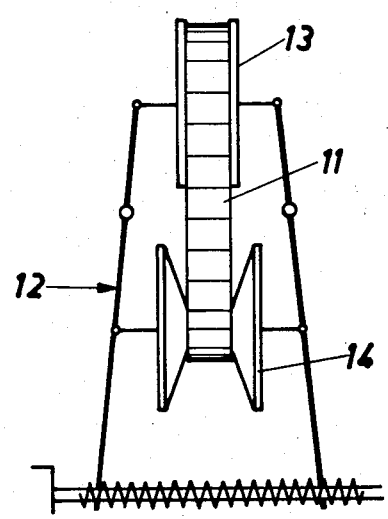
FIGS. 1 and 2 are schematic top and sectional views, respectively, of a stepless gear of the type with which the chain according to the invention is to be used.
Figure 2:
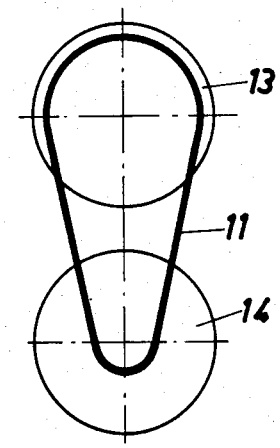
Figure 3:
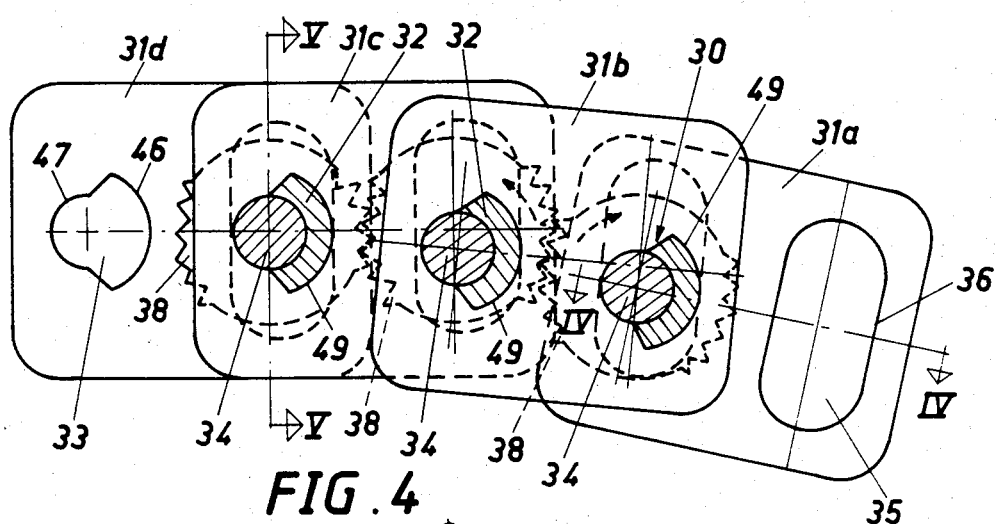
FIG. 3 is a side elevational partly cross-sectional view of some links in the chain according to the invention from the side perpendicular to the chain motion.

The chain according to the embodiment of FIGS. 3–6 consists of a large number of links 31 (denoted consecutively 31a, 31b, 31c, etc) which overlap and are coupled together with connections 30. Relative to the chain motion direction link 31a is thus coupled to link 31b, etc. Each link has in the illustrated embodiment in the direction of the motion a back recess 33 and a front hole 35. The back recess 33 is formed with two circular arc limits of which the front one 46 has a larger radius than the back one 47. The connection 30 consists of two parts movable with respect to each other, namely a thrust shaft 34 which extends outside of the links 31 with its end part 48 and rolling body 32. The thrust shaft 34 consists of a cylindrical stub the end parts of which are intended to cooperate with the conical plates 13, 14 of the steplessly adjustable gear shown in FIGS. 1 and 2. The back limiting surface 47 of the recess 33 is formed according to the thrust shaft 34, while the front limiting surface 46 is intended to non-rotatably fasten the rolling body 32 to the respective link 31. The thrust shaft 34 can thus rotate freely independently of the rotation motion of the link around the thrust shaft. The rolling body's 32 front circular arc covering surface 49 is intended to cooperate—roll against—the front limiting surface 36 in the direction of the chain motion of the hole 35, while the thrust shaft 34 is not in contact with the back limiting surface of the hole 35 when the chain is stretched. The front limiting surface 36 of the hole 35 can possibly be equipped with a pressure plate 42 which can be of hardened steel.

To the thrust shaft 34 at at least one and preferably at both ends outside the links 31 is attached a transmission piece 38a, 38b, 38c etc., which in FIG. 8 consists of a gear wheel, which couples together the thrust shafts in each link and also between the links.

A number of identical links are coupled together to link groups 31, at the ends of which the thrust shaft 34 sticks out, which is clear from FIG. 6. Such link groups are coupled together in series after each other and form an endless chain.

During periods when the thrust shaft 34 is in the free parts of the chain the force transmission takes place from the link 31 via the rolling body 32 to the following link. The thrust shaft 34 is not loaded during this period.

During the ingoing and outgoing phases of the thrust shaft 34 on the respective drive wheels the thrust shaft performs the required relative rotation motions with respect to the rolling body 32 by gliding. During periods of rounding the respective drive wheels the required force transmission takes place via the thrust shaft 34 over the rolling body 32 to the following link 31.

Figure 4:
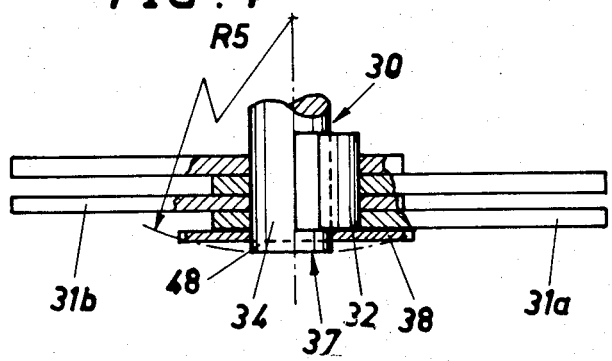
FIG. 4 is a cross-sectional view taken along the line IV—IV in FIG. 3.

To insure that the relative position between the connection 30 and the limiting surface 36 is retained, a partial surface along the limiting surface 36 is equipped with a tooth track 43, FIG. 4, which cooperates with a like formed tooth track in a partial surface of the rolling body's 32 rolling track. Such tooth tracks 43 must not necessarily lie in the same plane as the limiting surface 36.

The end surface 37 of the thrust shaft 34 is oblique with an angle mainly corresponding to half the conical angle for the conical wheel pair 13 and 14 respectively, with which the chain cooperates. The end surface 37 can be arched as is shown in FIG. 5. The end surface can also be extended to consist of a plane oblique surface.

The transmission apparatus 38 are appropriately made alike, whereby their teeth 39, 40 are displaced half a tooth distance with respect to each other.

Because rotations produced by the thrust shafts propagate along the chain's free parts a significant gap is left in the respective cooperating tooth rows 39, 40, so that the rotation motion of thrust shafts axles 34 decays along the chain's free parts.

FIG. 8 shows an alternative embodiment of the transmission piece 38a, 38b, 38c, etc., whereby a transmission apparatus is just about to enter over the conical plate pair. Because each transmission apparatus, e.g. 38b, during the entering phase rotates relative to the following transmission apparatus 38c, a cooperation between the two transmission apparatus 38b and 38c respectively is obtained via the modified tooth profiles 39, 40. To optimize this cooperation to obtain an adjustment of the transmission apparatus 38c to a position where the oblique end surface 37 at the thrust shaft 34c has a nearly ideal slope, the distance e1 should not differ from half the division distance between the thrust shafts 34 by more than 30%.

The tranmission pieces 38a, 38b, 38c, etc., which advantageously can be identical, are appropriately formed so that the pieces cooperate so that their rotation motions around their respective centers are limited to parts of a rotation.

The angle in FIG. 8 marks the slope of the thrust shaft's oblique end surface along the free part of the chain from a drive wheel of larger working radius to a drive wheel of smaller working radius.

The transmission apparatus 38 can advantageously be placed at both the thrust shaft's 34 sides of the link 31, and also form a uniting piece for each link. The rolling bodies 32 can then in a like manner advantageously be placed between pair mounted transmission apparatus 38. These can be mounted on the thrust shaft 34 as a fixture or alternatively as a press or weld attachment.

When the rolling body during the entering and exit phases rolls against the limiting surface 36 lengthening of the chain is therefore obtained which is proportional to changes in the working radius R1.

Figure 9:
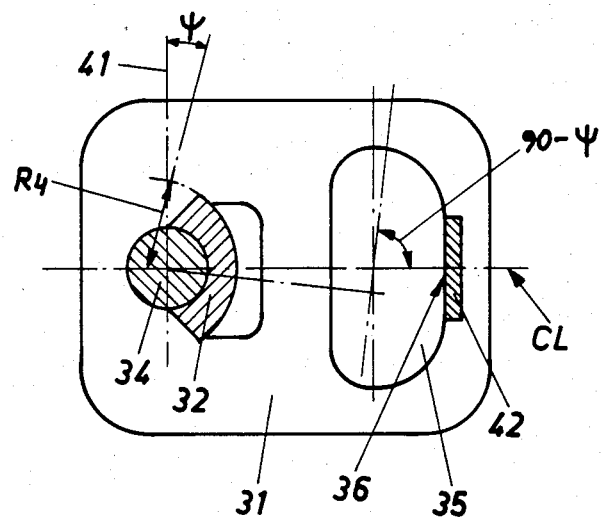
FIG. 9 is a side elevational view of an alternative embodiment of the rolling body according to FIG. 4.

For the embodiment according to FIG. 9 with a smaller rolling radius R4 on the connection 32 the required lengthening through rolling can be obtained if the limiting surface 36 is angled relative to the symmetry line 41 and angle. This is dependent on the radius R4 and also on the division distance between the thrust shafts and the working radius R1, and should be less than 7°, preferably less than 3°. For instance for a working radius R1=300 mm, a division distance t=12 mm and a rolling radius R4=5 mm the required chain lengthening is obtained for =1.82°.

Figure 10:
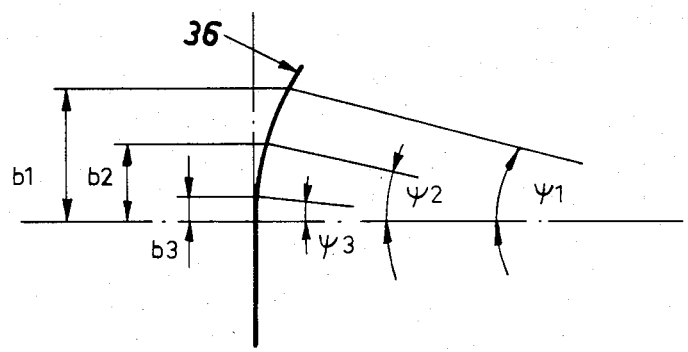
FIG. 10 is an enlarged schematic view of a rolling plane according to FIG. 4 in an alternative embodiment.

To eliminate the different from ideal lengthening of the chain which is obtained for an angle relevant to the other working radius present the limiting surface 36 should be in the shape of an elliptical arc, which is shown in FIG. 10.

For the present example where the division distance t=12 mm and R4=5 mm and if b1, according to FIG. 10, represents the relative displacement between the link and the link against which it rolls, one obtains thus 1=1.84°.

If b3 represents the largest working radius R1=70 mm one makes 3=0.76°. If b2 represents a mean value of the working radii, that is R1=50 mm, one makes 2=1.07°.

What is claimed is:

1. A power transmission chain comprising at least a series of overlapping links held together by joints in front and back connections as seen in the direction of motion in the form of thrust shafts, between which are placed cooperating transmission pieces, which upon rotation transmit a corresponding rotation to the next thrust shaft as seen in the direction of the chain motion, wherein each thrust shaft is non-rotatably fastened to at least one transmission apparatus comprising a force and motion communicating transmission part arranged to cooperate with the transmission part attached to the next thrust shaft.

2. Power transmission chain according to claim 1, wherein the transmission apparatus further comprises cooperating gear wheels, the teeth of which are displaced a half division distance in relation to each other.

3. Power transmission chain according to claim 2, wherein said cooperating gear wheels are made with a certain gap so that the transmission pieces' rotations decay along the length of the free chain.

4. Power transmission chain according to claim 3 wherein each link is rotatable to a limited extent around the link's back connection as seen in the direction of the chain motion, while the link's front connection is freely mounted in a hole shaped to allow a lengthening of the internal distance between the respective link's connections.

5. Power transmission chain according to claim 2 wherein each link is rotatable to a limited extent around the link's back connection as seen in the direction of the chain motion, while the link's front connection is freely mounted in a hole shaped to allow a lengthening of the internal distance between the respective link's connections.

6. Power transmission chain according to claim 1, wherein each transmission part comprises a cam wheel which is shaped to influence the next connection's wheel in one rotation direction while no influence is exerted in the opposite rotation direction.

7. Power transmission chain according to claim 6 wherein each link is rotatable to a limited extent around the link's back connection as seen in the direction of the chain motion, while the link's front connection is freely mounted in a hole shaped to allow a lengthening of the internal distance between the respective link's connections.

8. Power transmission chain according to claim 1, wherein each link is rotatable to a limited extent around the link's back connection as seen in the direction of the chain motion, while the link's front connection is freely mounted in a hole shaped to allow a lengthening of the internal distance between the respective link's connections.

9. Power transmission chain according to claim 8, wherein a rolling body is radially freely mounted on the thrust shaft shell surface, said rolling body being non-rotatably attached to a recess in the link's back connection, and with its circular arc outer shell surface being arranged to cooperate with the hole in the respective link.

10. Power transmission chain according to claim 9, wherein the connection's rolling body is equipped with friction increasing means.

11. Power transmission chain as claimed in claim 10 wherein said friction increasing means comprises teeth.

12. Power transmission chain according to claim 9 wherein the limiting surface of the hole cooperating with the rolling body in the front as seen in the direction of motion is equipped with friction increasing means.

13. Power transmission chain as claimed in claim 12 wherein said friction increasing means comprises teeth.

14. Power transmission chain as claimed in claim 12 and further comprising friction increasing means on said rolling body.

15. Power transmission chain as claimed in claim 14 wherein said friction increasing means comprises teeth.

* * * * *